(No Model.) 9 Sheets—Sheet 3.

R. CALLENDER.
PIPE ORGAN.

No. 426,711. Patented Apr. 29, 1890.

WITNESSES:
Chas. Nida
C. Sedgwick

INVENTOR:
R. Callender
BY Munn & Co.
ATTORNEYS.

(No Model.) 9 Sheets—Sheet 4.

R. CALLENDER.
PIPE ORGAN.

No. 426,711. Patented Apr. 29, 1890.

WITNESSES:
INVENTOR:
R. Callender
BY Munn & Co.
ATTORNEYS.

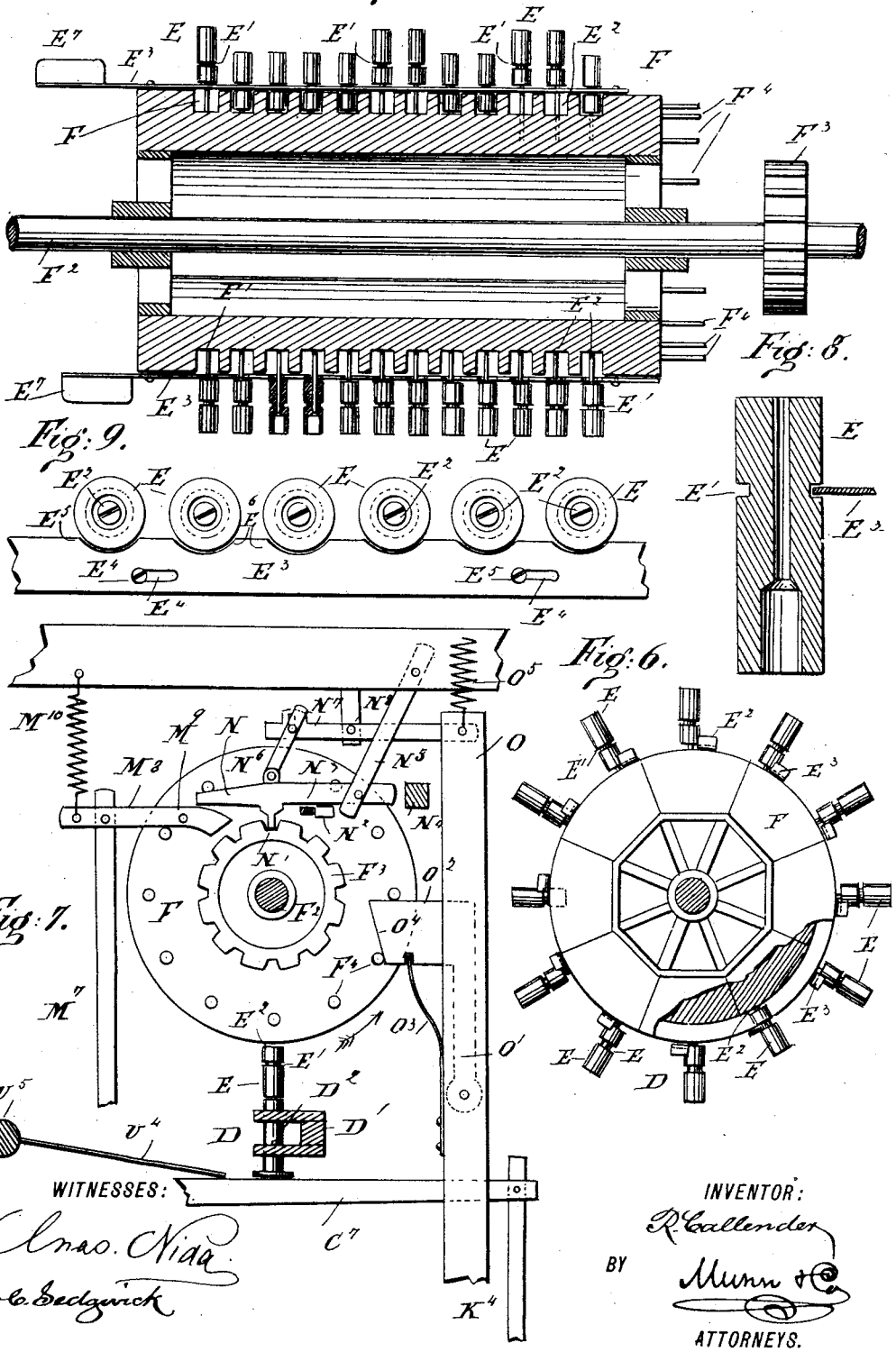

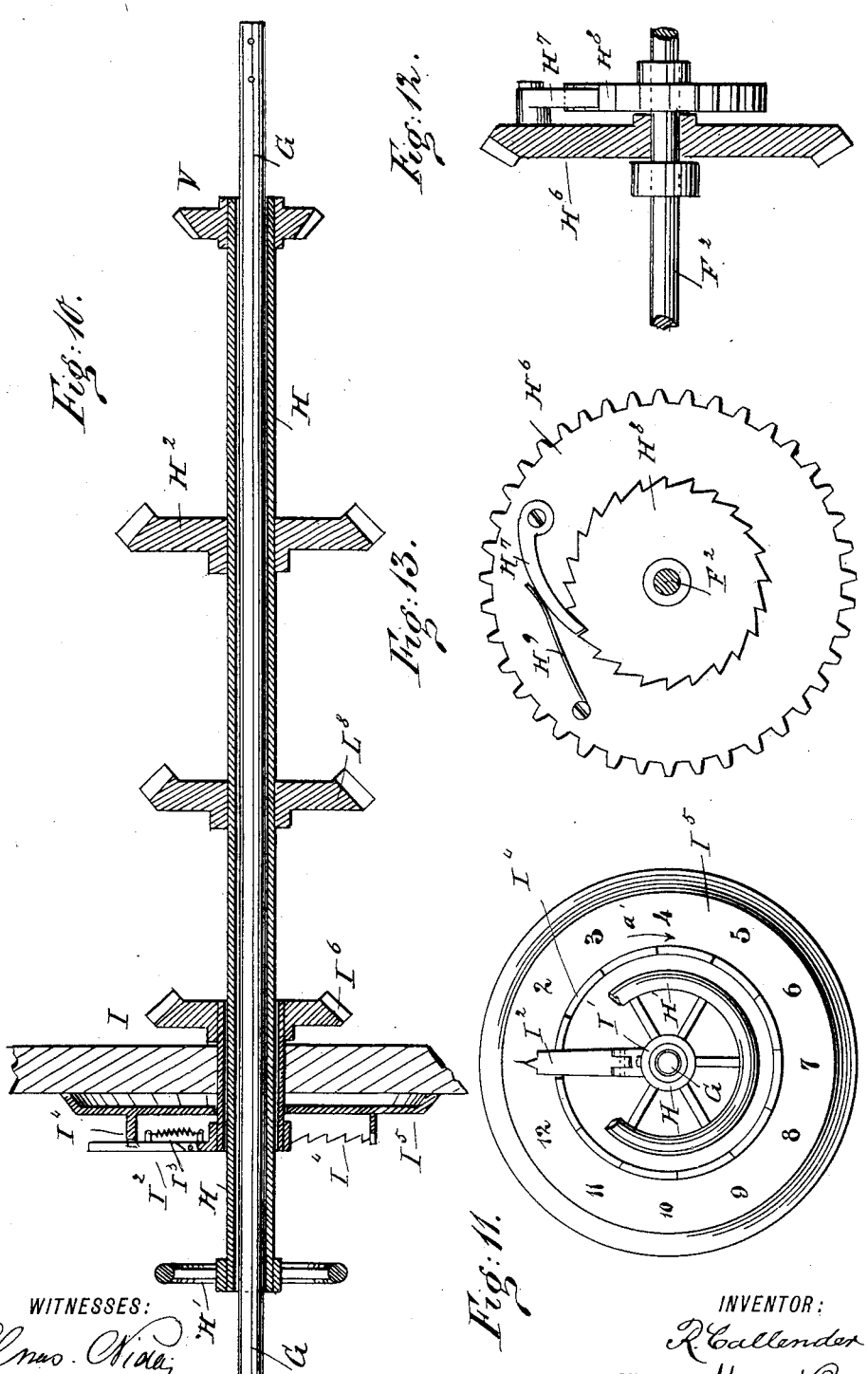

(No Model.) 9 Sheets—Sheet 7.
R. CALLENDER.
PIPE ORGAN.
No. 426,711. Patented Apr. 29, 1890.
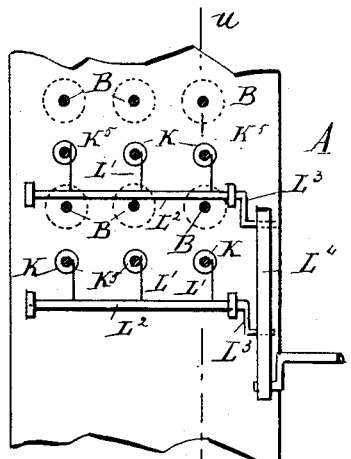
Fig. 14.
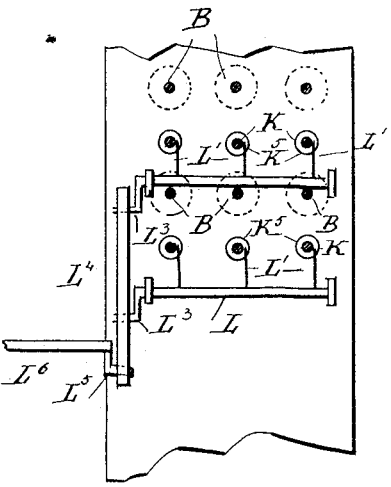
Fig. 15. Fig. 16. Fig. 17.
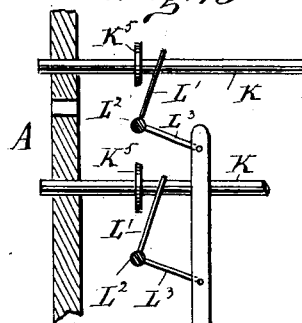
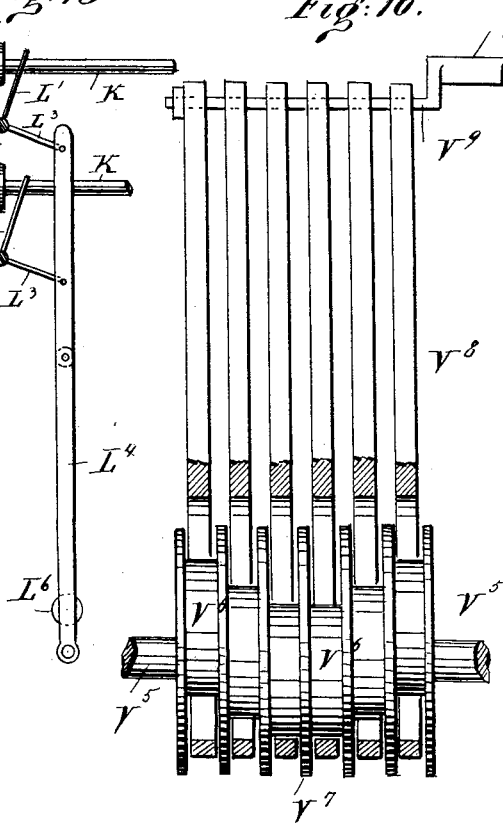
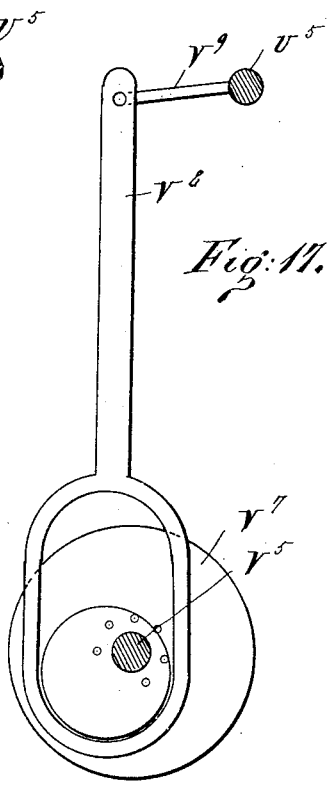
WITNESSES:
Chas. Nida
C. Sedgwick
INVENTOR:
R. Callender
BY Munn & Co.
ATTORNEYS.

(No Model.) 9 Sheets—Sheet 8.
R. CALLENDER.
PIPE ORGAN.
No. 426,711. Patented Apr. 29, 1890.
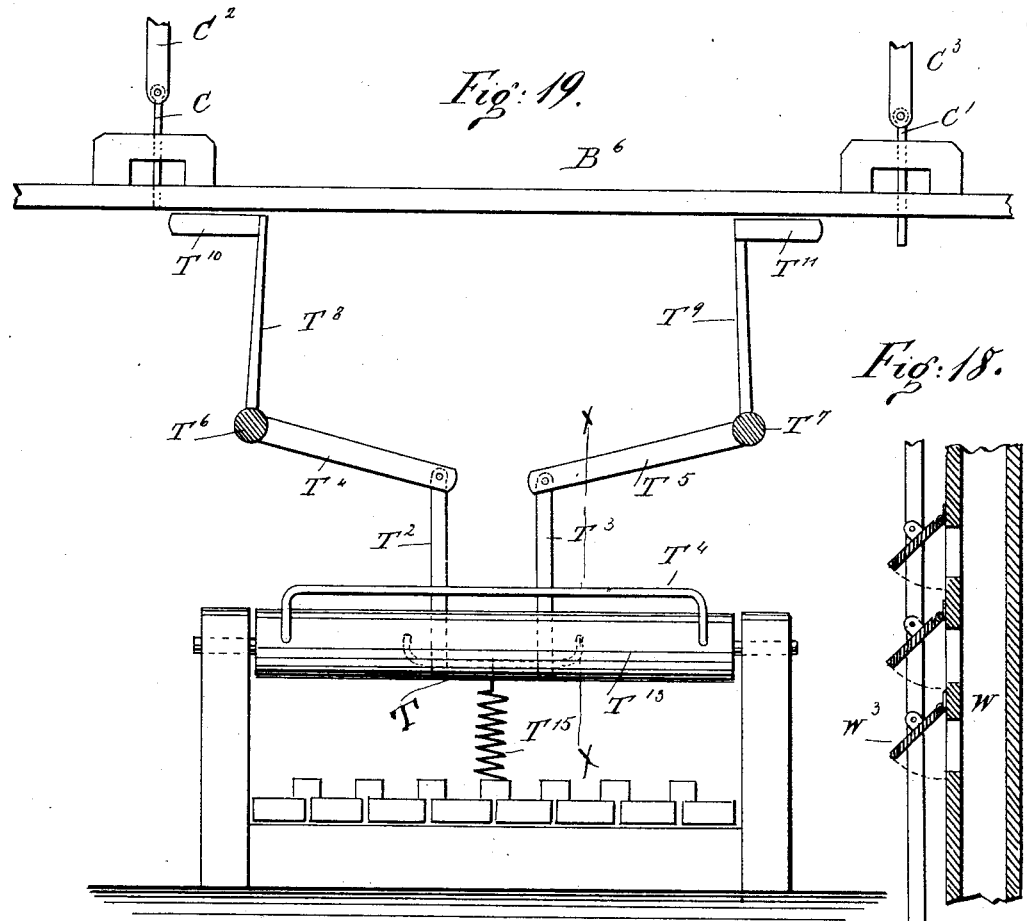
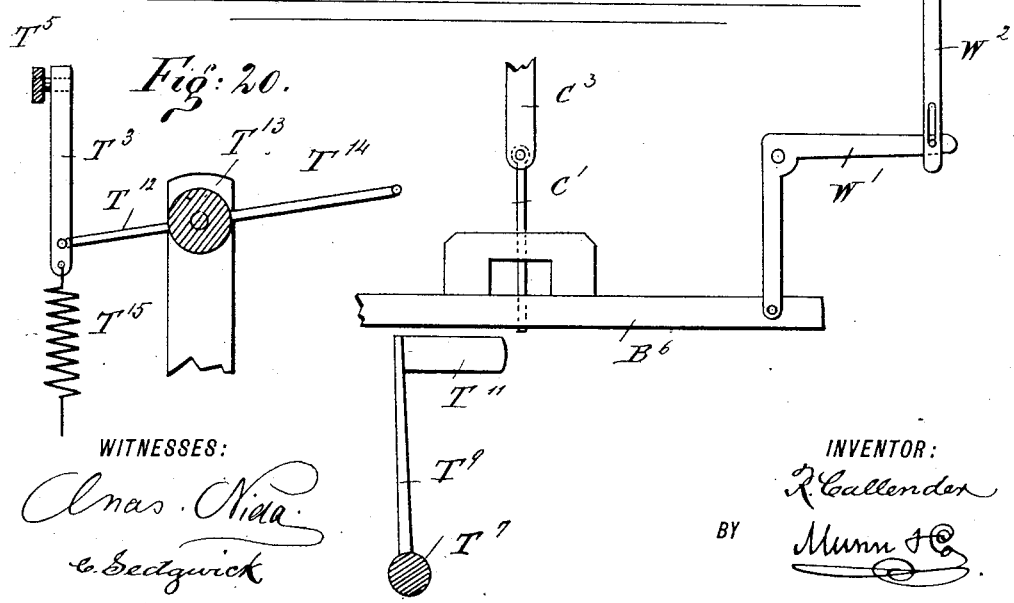
WITNESSES:
Anas. Nida.
C. Sedgwick.
INVENTOR:
R. Callender
BY Munn & Co.
ATTORNEYS.

(No Model.) 9 Sheets—Sheet 9.
R. CALLENDER.
PIPE ORGAN.
No. 426,711. Patented Apr. 29, 1890.
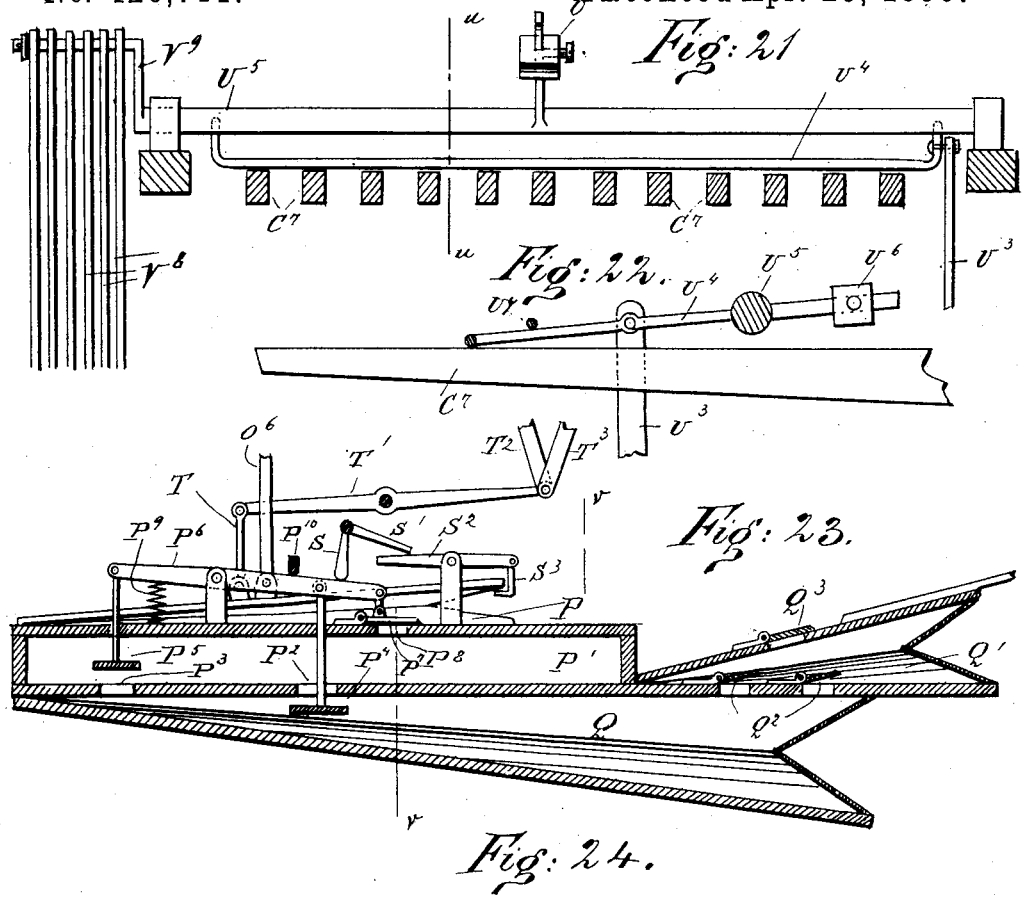
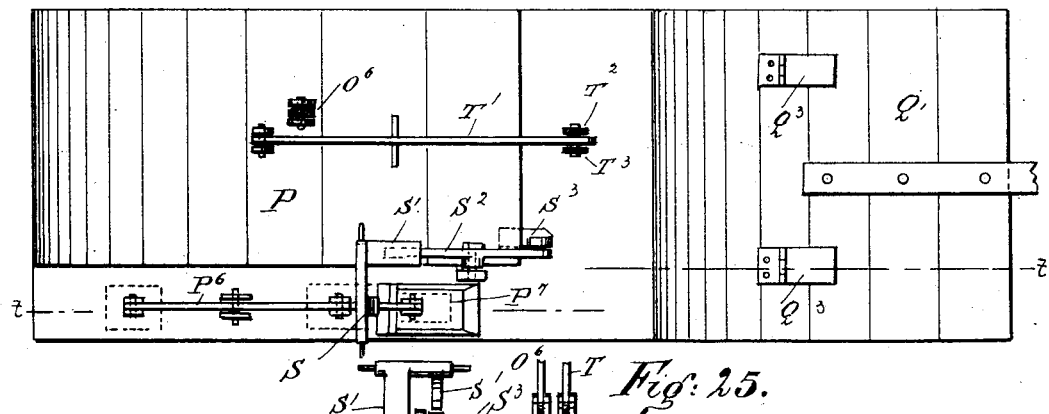
WITNESSES: 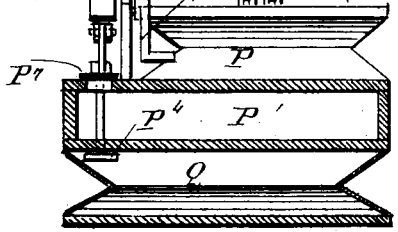 INVENTOR:
R. Callender
BY Munn & Co.
ATTORNEYS.

UNITED STATES PATENT OFFICE.

ROMAINE CALLENDER, OF BRANTFORD, ONTARIO, ASSIGNOR OF ONE-HALF TO JOHN PIPER MARTYN, OF ST. THOMAS, ONTARIO, CANADA.

PIPE-ORGAN.

SPECIFICATION forming part of Letters Patent No. 426,711, dated April 29, 1890.

Application filed October 22, 1888. Serial No. 288,799. (No model.)

*To all whom it may concern:*

Be it known that I, ROMAINE CALLENDER, a subject of the Queen of Great Britain, residing at Brantford, in the Province of Ontario and Dominion of Canada, have invented a new and Improved Pipe-Organ, of which the following is a full, clear, and exact description.

The object of the invention is to provide a new and improved pipe-organ which permits the performer to set a desired number of consecutive combinations of registers preparatory to execution of the music, and while playing the organ the several combinations can be produced consecutively without much physical exertion by the performer, so that the latter is enabled to pay more attention to the music-score.

The invention consists of any especially-designed cylinder held under the control of the operator and serving to store consecutively the various desired registered combinations, said cylinder controlling the opening and closing of the various pipes, swells, &c., of the organ.

The invention also consists of various parts and details and combinations of the same, as will be hereinafter fully described, and then pointed out in the claims.

Reference is to be had to the accompanying drawings, forming a part of this specification, in which similar letters and figures of reference indicate corresponding parts in all the views.

Figure 1:
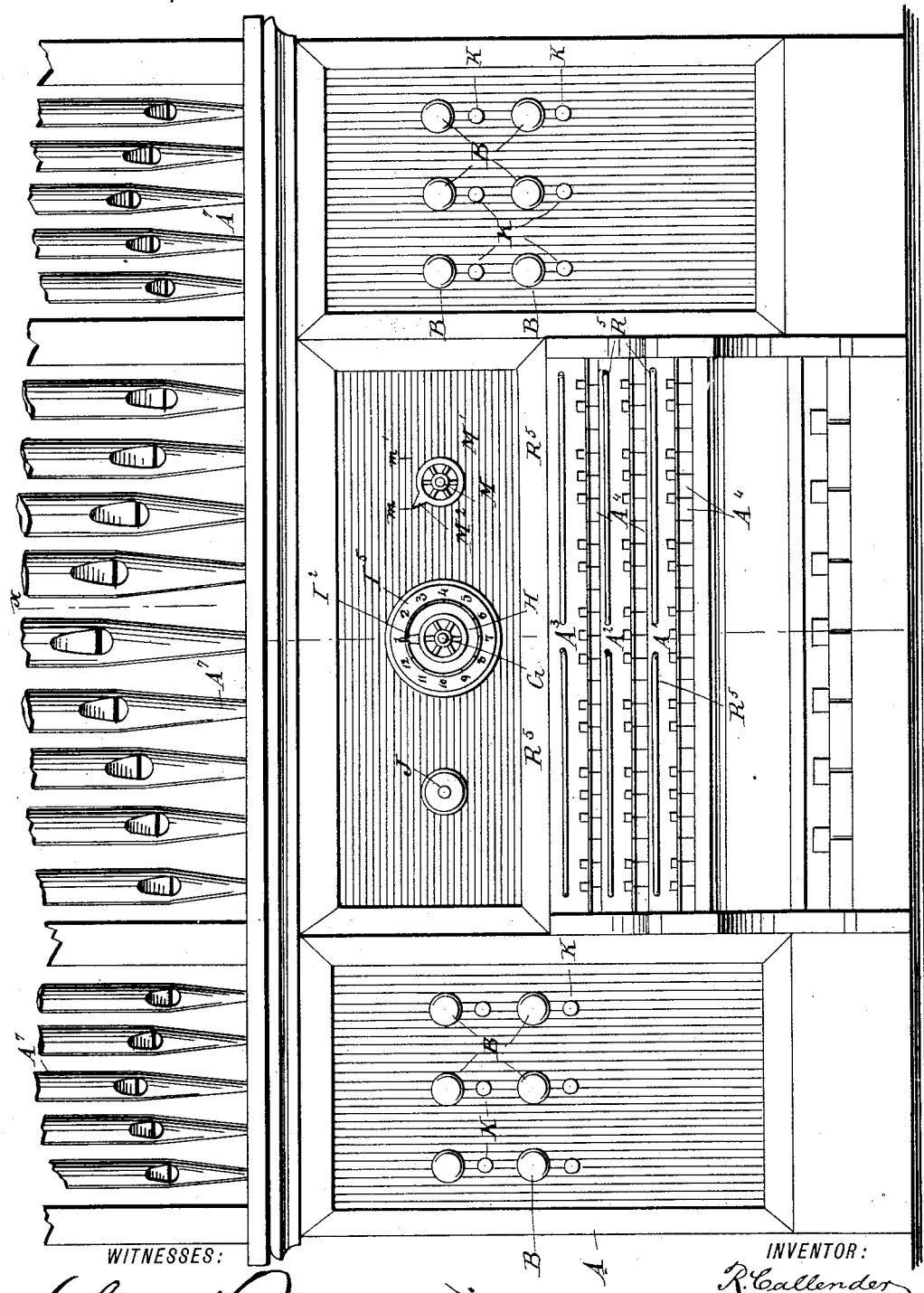
Figure 2:
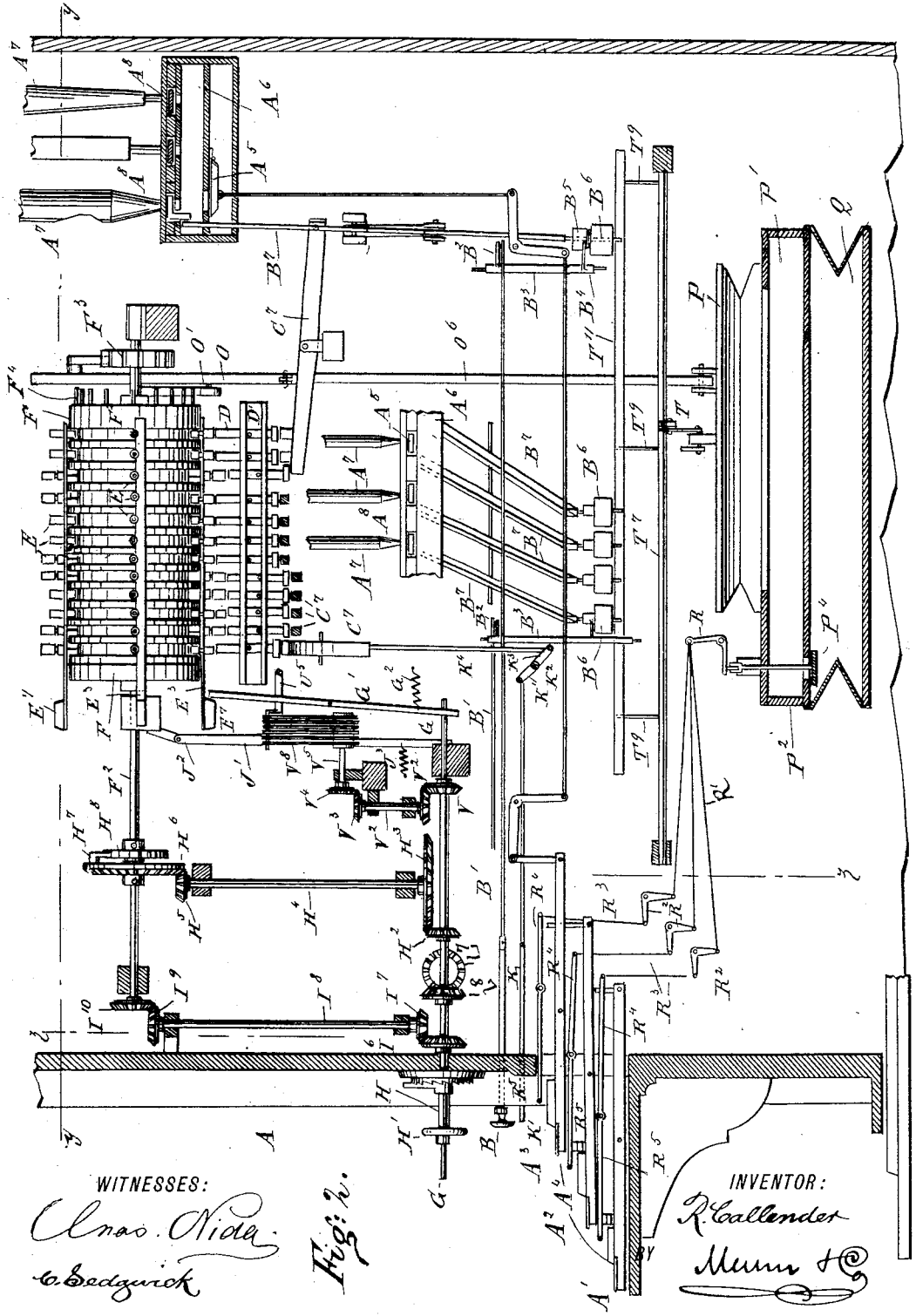
Figure 3:
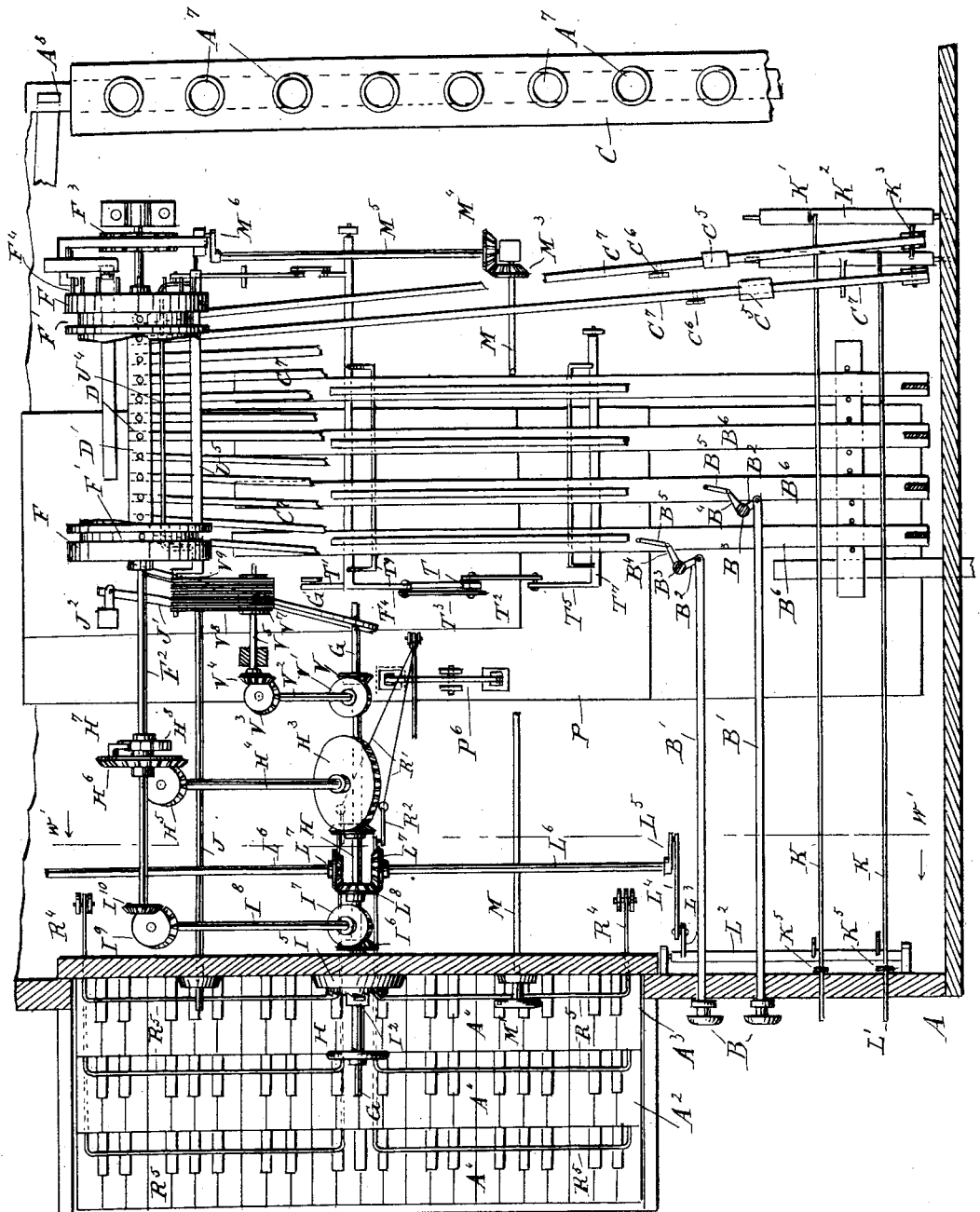
Figure 4:
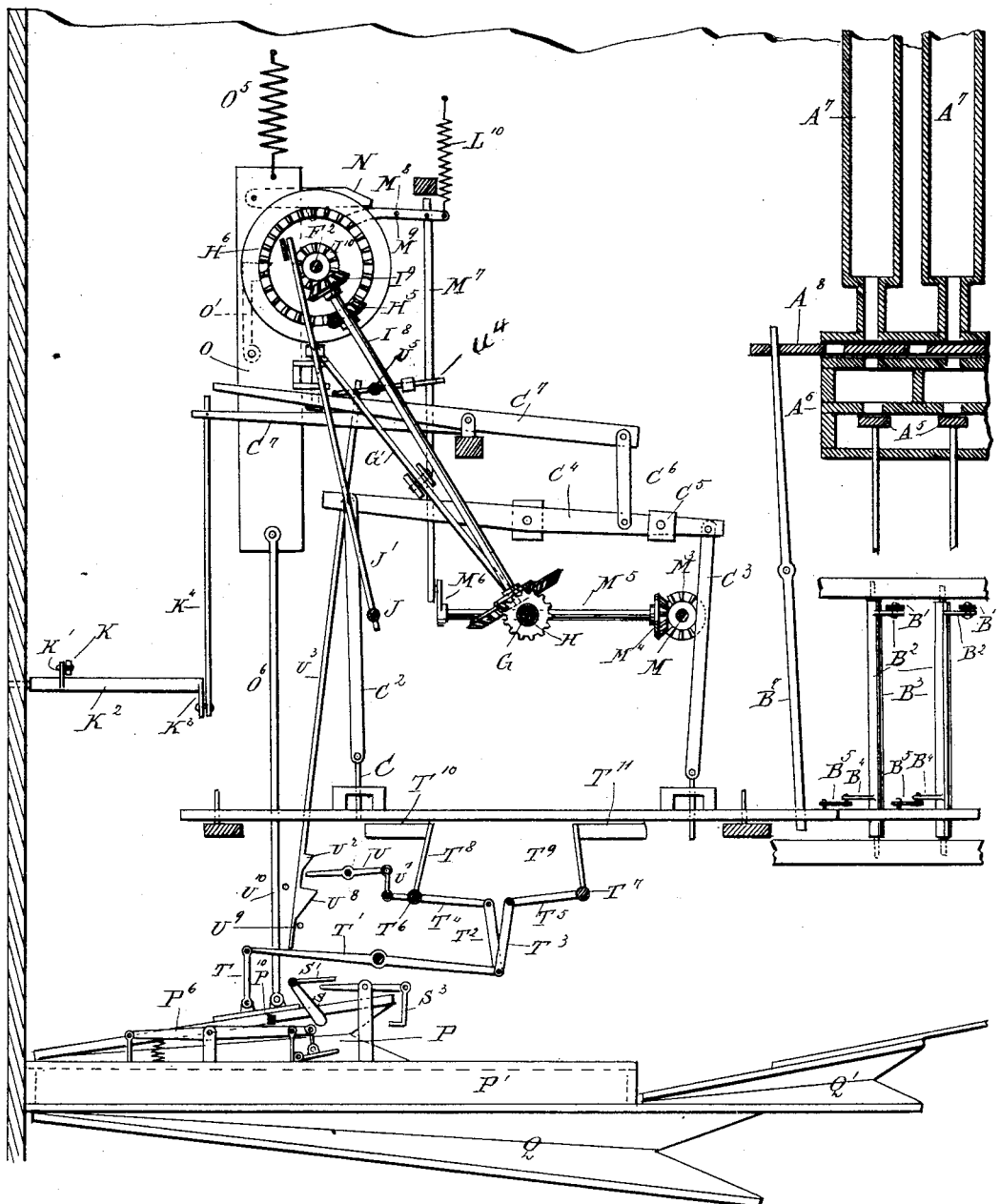

Figure 1 is a front view of the improvement. Fig. 2 is a transverse sectional elevation of the same on line *x x* of Fig. 1. Fig. 3 is a sectional plan view of the same on the line *y y* of Fig. 2. Fig. 4 is a sectional front elevation of the same on the line *z z* of Fig. 2. Fig. 5 is an enlarged longitudinal elevation of the storing-cylinder. Fig. 6 is an end elevation of the same with parts broken out. Fig. 7 is an enlarged end elevation, partly in section, of the devices for rotating and locking the cylinder. Fig. 8 is an enlarged sectional elevation of one of the plungers of the cylinder. Fig. 9 is a plan view of a row of plungers and their locking-slide. Fig. 10 is an enlarged longitudinal section of the dial and the main shaft. Fig. 11 is a face view of the same. Fig. 12 is a sectional side elevation of the transmitting gear-wheel and connections for rotating the cylinder. Fig. 13 is a rear face view of the same. Fig. 14 is an enlarged sectional elevation of the register-rods and connections on the line *w w* of Fig. 3, looking in the direction of the arrow *w'*. Fig. 15 is an enlarged sectional elevation of part of the same on the line *u u* of Fig. 14. Fig. 16 is an enlarged front view, partly in section, of the eccentric and connections for operating the levers controlling the opening and closing of the pipes, swells, &c. Fig. 17 is an end elevation of the same with the shafts in section. Fig. 18 is an enlarged sectional elevation of one of the swell-registers and its connections, the latter being shown in elevation. Fig. 19 is an enlarged front elevation of a device of modified form for operating the opening and closing of the pipes, swells, &c. Fig. 20 is a sectional elevation of part of the same on the line *v v* of Fig. 19. Fig. 21 is an enlarged sectional side elevation of the device for unlocking the levers from the bellows and eccentrics. Fig. 22 is a sectional front elevation of the same on the line *u u* of Fig. 21. Fig. 23 is an enlarged sectional side elevation of the bellows on the line *t t* of Fig. 24. Fig. 24 is a plan view of the same, and Fig. 25 is a transverse section of the same on the line *v v* of Fig. 23.

In pipe-organs as heretofore constructed several devices have been employed for enabling the performer to control the various registers of the instrument. The several devices now in use fall far short, in many important respects, of accomplishing the desired result, and, in fact, the more elaborate and comprehensive these devices are the more troublesome and difficult are they for a performer to control. In most organs at present in use a large number of pistons situated over and under the manuals are employed; also quite a large number of pedals are used. The pistons and pedals, when brought into action, produce certain fixed, and in some cases changeable, combinations. These devices, which often employ pneumatics and electricity as media for producing the effect here mentioned, are not only very costly, but, by reason of the multiplicity of pistons and pedals, they require in an organist who shall use them properly a large amount of dexterity, which it is almost impossible for him to acquire without many years of especial training and study. In addition, they do not give the organist power over all the resources of the instrument, many combinations having to be made by the hands, drawing out the required register-knobs. Again, although planned to concentrate the power of changing combinations as near as possible to the hand of a performer when playing, it will be found that these devices spoken of are scattered over the different manuals, and very frequently a performer, when using one manual and desiring to use another manual with some combinations not already prepared, finds it necessary to lift one hand off of its manual and move it to that particular part of some other manual, from which spot only can he control the desired combination. This always makes a break in the continuity of the music, which of course should be avoided as much as possible.

In smaller organs using composition pedals to produce changes of combination, and in large organs using these pedals, as well as pistons, already mentioned, it will be found that great confusion is sometimes caused by the various pedals being spread along under the feet of the performer, nearly always leaving him uncertain as to which particular pedal he is operating. In the pipe-organ presently to be described these serious defects are overcome in a radical manner, enabling the organist to produce easily any combination in the instrument without taking his hands off of the key-board.

In the drawings is illustrated a three-manual organ, but the improvements are adapted to organs of any desired number of manuals. The organ is provided with the usual frame A, on the front of which are located the keyboards $A'$, $A^2$, and $A^3$, each containing keys $A^4$, connected in the usual manner with the valves $A^5$, held in the several wind-chests $A^6$, of any approved construction, and located conveniently within the frame A. The wind-chests $A^6$ support the sounding-pipes $A^7$, arranged in the usual groups and adapted to be connected at their lower ends with the interior of the wind-chests $A^6$ by means of a slide $A^8$, operated by stops B under the control of the performer, and located at the front of the frame A at the sides of the key-board, so as to be within convenient reach of the performer, as is plainly illustrated in Fig. 1.

Each of the stops B is provided with the usual stop-rod $B'$, pivotally connected at its inner end with an arm $B^2$, formed of a shaft $B^3$, held vertically in suitable bearings in the frame A. At right angles to the arm $B^2$ is formed an arm $B^4$ on the shaft $B^3$, and the said arm $B^4$ is pivotally connected by a link $B^5$ with a connecting-rod $B^6$, mounted to slide longitudinally in the frame A. Each of the connecting-rods $B^6$ is pivotally connected by the lever $B^7$ with one outer end of the slide $A^8$, as is plainly shown in Fig. 4, so that when the operator draws one of the stops B the stop-rod $B'$ causes the shaft $B^3$ to turn, whereby the connecting-rod $B^6$ is moved in its bearings, and thereby swings the lever $B^7$, which draws the slide $A^8$ outward and disconnects the lower end of the group of pipes $A^7$ from the respective wind-chest $A^6$. An inward motion of the stop B causes the reversing of this movement, so that the slides $A^8$ are moved inward, and thereby connect the respective groups of pipes with the respective wind-chests $A^6$.

In each of the connecting-rods $B^6$ are held to slide vertically the pins C and $C'$, pivotally connected at their upper ends with the links $C^2$ and $C^3$, respectively, hung at the ends of a lever $C^4$, fulcrumed in its middle on a suitable pivot secured in the main frame A. On one side of the lever $C^4$ is held an adjustable weight $C^5$, and this side of the lever is also pivotally connected by a link $C^6$ with a lever $C^7$, located above the lever $C^4$, and also fulcrumed on a pivot in the main frame A.

On the top of the outer end of each of the levers $C^7$ is held a vertical pin D, mounted to slide in the arms of a U-shaped bar $D'$, secured firmly in the main frame A. A small pin $D^2$ passes through the pin D between the arms of the bar $D'$, so that the vertically-sliding movement of the pin D is limited to the distance between the arms of the bar $D^2$. The top of each of the pins D is adapted to engage the under side of one of the cylindrical plungers E at a time, each of which is provided with an annular groove $E'$, and held to slide on a pin $E^2$, which passes through an annular recess $F'$, and is secured in the rim of a cylinder F, secured on a shaft $F^2$, mounted to rotate in suitable bearings in the main frame A.

Each pin D is adapted to engage a certain number of plungers E, arranged in one of the annular grooves $F'$ in the cylinder F. The number of plungers in one of the annular grooves $F'$ depends on the number of combinations of which the instrument is capable. As shown in the drawings, Figs. 5 and 6, twelve plungers E are arranged in each annular groove $F'$ of the cylinder F, so that twelve different combinations form the range of the instrument at one time. The number of plungers in one group may be increased or diminished in order to change the range as desired. The number of grooves $F'$ in the cylinder F corresponds with the number of pins D and also with the number of levers $C^7$, operating the said pins D, and as each of the levers $C^7$ is connected, as above described, with one of the connecting-rods $B^6$, said number of grooves $F'$ in the cylinder F corresponds to the number of slides $A^8$.

The annular groove $E'$ in each plunger E divides the latter into an inner and outer part, of which the height of the inner part is equal to the depth of the annular groove F' in the cylinder F, so that when the plunger E is in its innermost position the groove E' is flush with the rim of the cylinder F. When the plunger E is in its outermost position on the pin E², the inner end of the plunger E is a short distance beyond the rim of the cylinder F, and is adapted to be engaged or locked in this outermost position by a slide E³, held longitudinally on the rim of the cylinder F by screws E⁵, passing through longitudinal slots E⁴, formed in each slide E³. The screws E⁵ screw into the rim of the cylinder F, so that each slide E³ can be moved forward and backward in close proximity to each row of pins E, arranged in the grooves of the cylinder F.

Each slide E³ is provided with a segmental notch E⁶, shaped to the rims of the plungers E, and located the same distance apart as the several plungers E in one longitudinal row in the cylinder F. When the slide E³ is in the position shown in Fig. 9, the notches E⁶ register with all the plungers in one row, so that the said plungers are free to move up and down on their respective pins E². When, however, the slide E³ is moved outward and the plungers are all in their outermost position on the pins E², then the inner end of the slide E³ passes over the innermost ends of the plungers E, and consequently prevents said plungers from moving inward on their pins E², thus locking the same in place. When the slide E³ is in the position shown in Fig. 9, then the plungers may be in their outermost position, as just described, or in their innermost position, so that when the slide is then moved the inner edge of the slide engages the annular grooves E' of those plungers which are in their innermost position, at the same time locking the outermost plungers in place, as above described.

On the outer end of each slide E³ is formed a lug E⁷, adapted to be engaged by the upper end of a lever G', pivoted in the main frame A, and resting at its lower end against the inner end of a rod G, mounted to slide forward and backward, and extending to the front of the frame A, directly above the key-boards A', A², and A³ in the center of the same. On the lever G' presses a spring G², which serves to hold the said lever in the position shown in Fig. 2 until the said lever is operated on by the rod G being pushed inward. When the lever G' is in the position shown in Fig. 2, the slides E³ are in the position shown in Fig. 9.

On the rod G is mounted to turn the hollow shaft H, carrying at its outer end, directly above the key-boards, a hand-wheel H', by which the performer is enabled to turn said main shaft H. On the latter is secured a bevel gear-wheel H², which meshes into a bevel gear-wheel H³, secured on the lower end of a shaft H⁴, mounted to rotate in suitable bearings in the main frame A, and carrying at its upper end a bevel-pinion H⁵, which meshes into a bevel gear-wheel H⁶, mounted to rotate loosely on the cylinder-shaft F². A pawl H⁷ is pivoted on one face of the bevel gear-wheel H⁶, and is adapted to engage a ratchet-wheel H⁸, fastened on the said shaft F². A spring H⁹ (see Figs. 12 and 13) holds the said pawl H⁷ in contact with the teeth of the ratchet-wheel H⁸. This arrangement serves to turn the cylinder, by other means hereinafter described, without disturbing the mechanism above described, and it also prevents the performer from turning the shaft F² and the cylinder F in the wrong direction, as the operator, when turning the hand-wheel H' in the wrong direction, moves the gear-wheel H⁶, so as to cause its pawl H⁷ to pass loosely over the ratchet-wheel H⁸ without turning the same, and consequently not moving the shaft F². When the operator turns the hand-wheel H' properly in the direction of the arrow a', then the gear-wheel H², meshing into the gear-wheel H³, turns the shaft H⁴, and the latter, by its gear-wheel H⁵, turns the gear-wheel H⁶, and the latter in its rotary movement turns the ratchet-wheel H⁸ by the pawl H⁷ engaging one of the teeth of the said ratchet-wheel H⁸. The shaft F² and the cylinder F are thus turned.

The gear-wheels H² H³ and H⁵ H⁶ are of such relative diameters that when the operator gives the hand-wheel H' one revolution the cylinder F is moved the distance between two plungers E in one of the annular grooves F' of the cylinder F. Thus one longitudinal row of the plungers E is always at the bottom of the cylinder F, directly above the row of pins D, as is plainly shown in Figs. 2 and 7.

On the hollow shaft H is held to rotate loosely a sleeve I', extending through the front of the main frame A, and carrying on its outer end a pointer I², pivoted on the said sleeve I', and held in contact, by a spring I³, with the teeth I⁴, arranged in a circle on a dial I⁵, provided with numerals from 1 to 12, corresponding to the number of plungers E arranged in one annular groove F' of the cylinder F. The spring I³ permits the pointer or hand I² to pass over the teeth I⁴ when the sleeve I' is turned. On the inner end of the sleeve I' is held a bevel gear-wheel I⁶, meshing into a bevel gear-wheel I⁷, fastened on the lower end of a shaft I⁸, mounted to rotate in suitable bearings in the main frame A, and carrying on its upper end a bevel gear-wheel I⁹, meshing into a bevel gear-wheel I¹⁰, secured on the outer end of the cylinder-shaft F². The gear-wheels I⁶ I⁷ and I⁹ I¹⁰ have such relative diameters that when the cylinder F is turned the distance between two successive plungers in one of the annular grooves F' the pointer I² moves from one tooth to the next following one—that is from one numeral to the next successive one. When the cylinder F has thus made a complete revolution, the pointer $I^2$ has also turned once around, counting from the left to the right. (See Fig. 1.)

On the left-hand side of the dial $I^5$ is arranged a rod J, held to slide in suitable bearings in the main frame A, and extending at its front end a short distance beyond the end of the frame A, so as to be within convenient reach of the operator seated in front of the organ. The inner end of the rod J presses against a lever $J'$, fulcrumed at its upper end at $J^2$ on a pivot held in the main frame A. The lever $J'$ is adapted to press the slides $E^3$ on the cylinder F inward, after being pushed outward by the lever $G'$, as before described. A spring $J^3$ presses on the lever $J'$, and serves to hold the latter in its outermost position, so that the rod J is also held in an outermost position until pressed inward by the operator. As soon as the latter removes the pressure on the rod J the lever $J'$ and the rod J return to their former position by the action of the spring $J^3$. It will be understood that the lever $G'$ serves to move the slides $E^3$ outward when the rod G is pressed inward, and the lever $J'$ moves the slide $E^3$ inward to its former position when the rod J is pushed inward.

Under each of the stops B is located a rod K, held to slide in suitable bearings in the frame A, and pivotally connected at its inner end with an arm $K'$, fastened on a shaft $K^2$, mounted to turn in suitable bearings on the main frame A. On the rod $K^2$ is arranged an arm $K^3$, standing at right angles to the arm $K'$, and pivotally connected with a link $K^4$, pivotally connected at its upper end with a lever $C^7$. The number of levers $C^7$ corresponds to the number of rows of plungers E and to the number of stops B, and consequently to the number of rods K, so that each of the latter operates one of the levers $C^7$.

Near the front end of the rod K is held a collar $K^5$, resting, when the rod K is in its outermost position, against the front of the frame A. (See Fig. 3.) The collar $K^5$ of each rod K is adapted to engage a pin $L'$, secured on a shaft $L^2$, extending horizontally and mounted to turn in suitable bearings fastened on the front of the frame A. The shaft $L^2$ is provided with an arm $L^3$, pivotally connected by a link $L^4$ with a crank-arm $L^5$, secured on one end of a shaft $L^6$, extending longitudinally and mounted to rotate in suitable bearings on the main frame A. On the inner end of the shaft $L^6$ is held a bevel gear-wheel $L^7$, meshing into a bevel gear-wheel $L^8$, fastened on the main shaft H.

The rods K, placed in a horizontal line on one side of the key-boards, operate by their collars $K^5$ on the pin on one shaft $L^2$, and the several shafts $L^2$ on one side of the key-board connect by their respective crank-arms $L^3$ with the crank $L^4$, as above described, said crank $L^4$ being pivotally connected with the crank-arm $L^5$ on the shaft $L^6$. As rods K are placed on both sides of the key-board under the stops B, the shafts $L^6$ are employed and provided with gear-wheels $L^7$, both operated from the gear-wheel $L^8$ on the main shaft. (See Figs. 3, 14, and 15.) When the hand-wheel $H'$ makes one revolution, the shafts $L^6$ also rotate once by the action of the gear-wheels $L^7$ and $L^8$, so that the crank-arm $L^5$ on each of the shafts $L^6$ imparts a swinging motion to the shafts $L^2$, so that the pins $L'$ are moved once forward and back again to their former position. This movement of the shafts $L^2$ causes all the rods K which had been pushed in to be pushed out again to assume the positions shown in Fig. 3—that is, with the collars $K^5$ resting against the inside of the front of the frame A. The pins $L'$ have such a position that the rods K can be pressed in again until the collars $K^5$ nearly strike against the pins $L'$, as shown in Fig. 15.

On the right-hand side of the indicating-disk $I^5$, directly over the key-boards, is located a hand-wheel $M'$, fastened on the outer end of a shaft M, mounted to turn in suitable bearings in the frame A. On the hand-wheel $M'$ is formed a pointer $M^2$, (see Fig. 1,) adapted to indicate on the line $m\ m'$, marked on the front of the main frame or casing A. On the rear or inner end of the shaft M is secured a bevel gear-wheel $M^3$, meshing into a bevel gear-wheel $M^4$, secured on a shaft $M^5$, mounted to turn in suitable bearings on the main frame A, and carrying on its other end a crank-arm $M^6$, pivotally connected by a vertically-extending link $M^7$ with a pawl $M^8$, fulcrumed at $M^9$ on the main frame A, and provided with a spring $M^{10}$ for holding the said pawl $M^8$ in a normal position. The inner end of the pawl $M^8$ is curved downward and serves to lift a pawl N, provided with a downwardly-extending lug $N'$, adapted to engage a notched wheel $F^3$, secured on the shaft $F^2$, carrying the cylinder F. This pawl N, when engaging by its lug $N'$ the notched wheel $F^3$, locks the cylinder F in place. The notches in the wheel F correspond in number to the number of rows of plungers E held on the cylinder F. Said pawl N has a forward-and-backward-sliding movement between the stops $N^3$ and $N^4$. The rear end of the pawl N abuts for this purpose against the stop $N^4$, and a lug $N^2$, fastened on the under side of the pawl N, serves to abut against the stop $N^3$, both stops $N^3$ and $N^4$ being secured to the main frame A. The pawl N is hung on the parallel links $N^5$ and $N^6$, of which the former is pivoted on the main frame A, and the link $N^6$ is pivoted on one end of a lever $N^7$, fulcrumed at $N^8$ to the main frame A. The other end of the lever $N^7$ is pivotally connected with a vertical plate O, (see Fig. 7,) having a vertical-sliding motion, as hereinafter more fully described, and carrying a pivoted arm $O'$, having a right-angular offset $O^2$, which has its front end $O^4$ beveled. A spring $O^3$ engages a notch in the offset $O^2$ and is fastened to the plate O. The spring $O^3$ serves to hold the offset $O^2$ in an outermost position, as shown in Fig. 7. The beveled end $O^4$ is adapted to engage pins $F^4$, projecting from one end of the cylinder F. The number of pins $F^4$ corresponds to the number of notches in the wheel $F^3$, and also to the number of longitudinal rows of plungers E in the cylinder F. On the upper end of the plate O is connected a spring $O^5$, which serves to pull said plate O upward into the position shown in Fig. 7 after it has been pressed downward by the mechanism hereinafter described.

When the hand-wheel $M'$ is in the position shown in Fig. 1, then the pawl N and the pawl $M^8$ are in the position shown in Fig. 7. Now, when the operator turns the hand-wheel $M'$ so that its pointer $M^2$ passes from the line $m$ to the line $m'$, (see Fig. 1,) then the gear-wheels $M^3$ and $M^4$ cause the shaft $M^5$ to turn, and the crank-arm $M^6$ pulls the link $M^7$ downward, whereby the pawl $M^8$ is swung upward at its curved end, thereby raising the pawl N. The lug $N'$ is thus thrown out of contact with the respective notch in the wheel $F^3$ of the cylinder F, so that the latter is free to be operated. The link $N^6$ connects by its pin with a slot in the lever $N^7$, as is plainly shown in Fig. 7, so that the pawl N is free to move upward without the adequate downward movement of the plate O. When the operator turns the hand-wheel $M'$ back to its former position, so that the pointer $M^2$ moves from the line $m'$ to the line $m$, then the pawl $M^8$ is returned to its former position and the pawl N is free to again engage by its lug $N'$ a notch in the wheel $F^3$. The spring $M^{10}$, connected with the pawl $M^8$, facilitates the return movement of the latter when the hand-wheel $M'$ is turned, as before described.

The lower end of the plate O is pivotally connected by a link $O^6$ with the top of the bellows P. The bellows P are set upon a fixed box $P'$, with which they communicate, as is plainly illustrated in Fig. 25. On the under side of the box P is formed a large bellows Q, connected with an operating-bellows $Q'$ by means of the valves $Q^2$. The bellows $Q'$ are provided with the valve $Q^3$, leading to the outside. The bellows $Q'$ are set in motion by any suitable mechanism, and serve to draw the air from the bellows Q and discharge it to the outside through the valve $Q^3$. In the bottom of the box $P'$ are formed the openings $P^2$ and $P^3$, adapted to be opened and closed by the valves $P^4$ and $P^5$, arranged on the under side or upper side, respectively, of the said bottom of the box, as shown in Fig. 23. The valves $P^4$ and $P^5$ are connected by rods with the ends of a lever $P^6$, fulcrumed on a suitable post erected on top of the box $P'$. One outer end of the lever $P^6$ is also connected with a bleeding-valve $P^7$, operating over an aperture $P^8$ formed in the top of the box $P'$. A spring $P^9$ acts on the lever $P^6$ and serves to hold the valves $P^4$ and $P^5$ closed and the valve $P^7$ open, so that the box $P'$ and the bellows P are in direct connection with the outer air until the lever $P^6$ is operated on, as hereinafter more fully described. On the lever $P^6$ rests one end of a bell-crank lever R, fulcrumed in the main frame A and connected by rods $R'$ with a number of bell-crank levers $R^2$, each pivotally connected by a rod $R^3$ with a U-shaped lever $R^4$, fulcrumed in the front of the frame A, its middle finger-bar $R^5$ extending above the key-boards $A'$, $A^2$, and $A^3$, as is plainly shown in Figs. 1 and 2. As illustrated in Fig. 1, I provide two U-shaped levers $R^4$ for each key-board, the middle finger-bars $R^5$ of said levers extending in line with each other. The bars $R^5$ are within convenient reach of the hands of the operator playing on the key-boards, and as the said middle bars $R^5$ of the levers $R^4$ extend over the entire length of each key-board the operator can conveniently press one of the said levers, no matter where he is playing at the time. By pressing any one of the levers $R^4$ the respective bell-crank lever $R^2$ is turned and causes the bell-crank lever R to swing, whereby the arm of the said bell-crank lever R, resting on top of the lever $P^6$, is swung downward, thus causing a like motion of the right-hand end of the lever $P^6$, whereby the valves $P^4$ and $P^5$ are opened, and at the same time the bleeding-valve $P^7$ is closed. The air now passes from the bellows P into the casing $P'$ through the openings $P^2$ and $P^3$ into the bellows Q. This rushing of the air from the bellows P to the bellows Q causes collapsing of the bellows P, so that the rod $O^6$ is moved downward.

In order to hold the valves $P^4$ and $P^5$ open when the operator touches and releases the bar $R^5$ of the lever $R^4$, I provide a gravity-pawl S, fulcrumed in the main frame A and resting in an inclined position on top of the lever P. The pawl S is provided with an arm $S'$, extending at right angles to the pawl S, and adapted to press on one end of the lever $S^2$, fulcrumed on the main frame A, and provided on its other end with a downwardly-extending rod $S^3$, having an inwardly-extending lug $S^4$, on which operates the outer end of the top of the bellows P when the latter collapses. The stop $P^{10}$ on top of the lever $P^6$ limits the swinging motion of the gravity-pawl S. When the operator presses on the lever $R^4$, as above described, the lever $P^6$ is moved downward a short distance to open the valves $P^4$ and $P^5$; but the latter would immediately close again as soon as the operator released the pressure on the lever $R^4$, and consequently but a small quantity of air would escape through the openings $P^2$ and $P^3$, and the bellows P would not immediately collapse. To prevent this is the object of the gravity-pawl S.

When the bell-crank lever R presses the lever $P^6$ downward, the gravity-pawl S swings into a vertical position against the stop $P^{10}$, thus locking the lever $P^6$ in an inclined position, and thereby holding the valves $P^4$ and $P^5$ open against the tension of the spring $P^9$. Now when the bellows P have almost fully collapsed the outer end of the top of the bellows P strikes against the lug $S^4$ of the rod $S^3$, so that the said rod $S^3$ is moved downward and causes a swinging of the lever $S^2$, whereby the inner end of the said lever acts against the arm $S'$ and swings the same upward and again throws the gravity-pawl S into its former inclined position. The lever $P^6$ is then returned to its horizontal position by the action of the spring $P^9$ and the valves $P^4$ and $P^5$ are instantly closed. Thus it will be seen that when the operator touches one of the levers $R^4$ the bellows P collapse, as above described. When the lever $P^6$ swings into its horizontal position and the bleeding-valve $P^7$ is again opened, then the air from the outside again fills the bellows P, so that the latter swells again and moves the rod $O^6$ upward. The air passed into the bellows Q is discharged from the same through the valves $Q^8$ by the action of the bellows $Q^{10}$, before described. The movable top of the bellows P is also connected by a link T with one end of the lever $T'$, fulcrumed in the main frame A and pivotally connected by the links $T^2$ and $T^3$ with crank-arms $T^4$ and $T^5$, respectively, secured on the shafts $T^6$ and $T^7$, mounted to turn in suitable bearings on the main frame A. From the shafts $T^6$ and $T^7$ extend the arms $T^8$ and $T^9$, carrying the horizontal plates $T^{10}$ and $T^{11}$, held under the connecting-rods $B^6$, and serving to operate the latter longitudinally by engaging the respective pins C or $C'$. When the bellows P collapse, as above described, the inner end of the lever T is swung upward, thus turning the shafts $T^6$ and $T^7$, whereby the plates $T^{10}$ and $T^{11}$ are moved in opposite directions, and, according to their position, engage the corresponding pins C or $C'$, held in their lowermost position, thus shifting the connecting-rods $B^6$, and thereby operating the slides $A^8$.

The shaft $T^6$ is pivotally connected by a link $U'$ with a lever U, fulcrumed in the main frame A and operating against a wedge $U^2$, formed on the upwardly-extending rod $U^3$, pivoted on a U-shaped frame $U^4$, secured by its ends on a shaft $U^5$, mounted to turn in suitable bearings in the main frame A, and located directly above the levers $C^7$. The middle part of the U-shaped frame $U^4$ rests on top of the said levers $C^7$, and serves to press the same downward when desired. The frame $U^4$ is counterbalanced by a weight $U^6$, and its upward motion is limited by a fixed stop $U^7$, secured in the frame A. Below the wedge $U^2$ is held a second and somewhat larger wedge $U^8$, operating with its incline on a fixed pin $U^9$, held in the frame A and serving to swing the said rod $U^3$ sidewise, so as to let the lever U swing downward without touching the wedge $U^2$. The swinging motion of the rod $U^3$ is limited between the pins $U^9$ and $U^{10}$, as is plainly shown in Fig. 4. The shaft $U^5$ is also operated on from the main shaft II. The latter is for this purpose provided at its inner end with the bevel gear-wheel V, meshing into a bevel gear-wheel $V'$, secured on a shaft $V^2$, mounted to rotate in suitable bearings in the main frame A, and carrying on its upper end the bevel gear-wheel $V^3$, meshing into the bevel gear-wheel $V^4$, fastened on one end of a horizontally-extending shaft $V^5$, also mounted to rotate in suitable bearings in the main frame A. The shaft $V^5$ (see Figs. 16 and 17) carries six eccentrics $V^6$, divided from each other by circular flanges $V^7$, as is plainly shown in Fig. 16.

The six eccentrics $V^6$ have their centers placed in a circle formed around the shaft $V^5$, the eccentric centers being placed in six corners of the septagonal figure, so that two eccentrics are twice as far apart as the rest, as illustrated in Fig. 17, one of the corners of the septagonal figure not being used as a center for one of the eccentrics, as only six eccentrics are placed in the corners of the septagonal figure formed around the shaft $V^5$. On each of the eccentrics $V^6$ is held a slotted eccentric-strap $V^8$, and the several eccentric-straps are pivotally connected with a crank-arm $V^9$, formed on one outer end of the shaft $U^5$, previously described, its frame $U^4$ operating over the lever $C^7$. When the shaft $V^5$ makes one revolution, the eccentrics $V^6$ operate consecutively on their eccentric-straps $V^8$, so that the crank-arm $V^9$ is operated on very quickly and moved downward so as to turn the shaft $U^5$ quickly. The moment the last eccentric is in its lowermost position—that is, during one-seventh of its revolution—all of the eccentric-straps $V^8$ move upward and return the crank-shaft $V^9$ and the shaft $O^5$ to their former position, as shown in Figs. 16 and 17. The shaft $V^5$ makes one revolution when the hand-wheel $H'$ on the main shaft II is turned around once, and consequently an up-and-down movement is given to the crank-arm $V^9$, after each revolution of the hand-wheel $H'$.

Instead of operating the shafts $T^6$ and $T^7$ from the bellows P, as previously described, I may actuate the same from a treadle, as shown in Fig. 19. In this case the links $T^2$ and $T^3$ are pivotally connected to a frame $T^{12}$, fastened on the shaft $T^{13}$, mounted to rotate in suitable bearings secured to the front of the main frame A, and from the said shaft $T^{13}$ extends a treadle $T^{14}$, (shown in Fig. 20,) adapted to be operated by the feet of the performer. Directly above the pedals of the organ a spring $T^{15}$ is connected with the frame $T^{12}$, so as to return the links $T^2$ and $T^3$, and consequently the shafts $T^6$ and $T^7$, to their former position when the operator removes his feet from the treadle $T^{14}$.

In Fig. 18 is illustrated the manner in which a swell W is operated. The respective connecting-rod $B^6$ is pivotally connected to one arm of a bell-crank lever $W'$, which has its other arm pivotally connected with an upright rod $W^2$, on which are pivotally connected the shutters $W^3$ of the swell W. When the connecting-rod $W^2$ is shifted forward or backward, as hereinafter more fully described, the shutters $W^3$ of the swell W are opened or closed in a similar manner to the slides $A^8$, connecting the sounding-pipes $A^7$ with the wind-chests $A^6$.

The operation is as follows: When the operator desires to perform on the organ several pieces of music in succession, he first sets the various combinations of registers consecutively according to the music-score preparatory to executing music, as follows: The pointer $I^2$ stands for the first combination of registers at the numeral 1 on the dial $I^5$. The rods G and J are in their outermost position, and the hand-wheel $M'$ stands with its pointer $M^2$ on the line $m'$, so that the pawl $M^8$ lifts the pawl N, thereby disengaging the lug $N'$ from the notched wheel $F^3$, and the cylinder F is free to be turned. The stops B are all pushed in, so that the slides $A^8$ disconnect the pipes $A^7$ from the wind-chests $A^6$. The first combination of registers according to the music-score is now set by the operator pushing inward the respective small stops K, located under the corresponding stops B, desired to form the first combination of registers. The inward movement of the stops K causes the respective shafts $K^2$ to turn, so that the rods $K^4$ move the corresponding levers $C^7$ downward, thereby permitting the respective pins D to slide downward by their own gravity in the frame $D'$. The other pins D not operated on remain with their plungers E in the lowermost longitudinal row of plungers on the cylinder F in their innermost position, so that their annular grooves $E'$ are in line with the corresponding slides $E^3$. The operator now presses the rod G inward, so that the lever $G'$ is swung and draws the lowermost slide $E^3$ outward, whereby all the plungers E in the lowermost longitudinal row of plungers on the cylinder F are locked in position. It is understood that the outward movement of the slide $E^3$ locks not only the plungers moved downward, as above described, by the action of the levers $C^7$, but also the plungers remaining in their innermost position. Thus a number of the said plungers in the lowermost longitudinal row of plungers are in their innermost position and some are in their outermost position. This longitudinal row of plungers now forms the first combination of registers. The operator now turns the hand-wheel $H'$ around once, whereby the cylinder F is turned the distance of one division, so that the next row of longitudinal plungers is thrown into a lowermost position. The turning of the cylinder F causes a corresponding movement of the shaft $I^8$, which, by the gear-wheels $I^6$ and $I^7$, turns the sleeve $I'$, and the pointer $I^2$ is moved to the right one tooth $I^4$ on the indicator-dial $I^5$, so that the said pointer now stands over the numeral 2. The turning of the hand-wheel $H'$, as above described, also causes the turning of the shaft $V^5$, carrying the eccentrics $V^6$, so that the latter operate on the shaft $U^5$, which, by its frame $U^4$, presses the levers $C^7$ downward, whereby all of the pins D slide downward and permit the second longitudinal row of plungers E to pass into a lowermost position on their corresponding pins $E^2$. As soon as the second longitudinal row of plungers is above the pins D, then the eccentrics $V^6$ permit a rapid upward motion of the crank-arm $V^9$, and turning of the shaft $U^5$ by the action of the weights $C^5$ on the levers $C^7$, which press against the frame $U^4$ held on top of the levers $C^6$ and secured to the said shaft $U^5$. During the one revolution of the shaft H the shafts $L^6$ and $L^2$ are turned, so that the pins $L'$ press against the collars $K^5$ of those stops K which had been pressed in to form the first combination of plungers in the first longitudinal row of plungers on the cylinder F. All the previously pressed-in stops K are thus moved out again and the pins $L'$ assume their former position, as shown in Fig. 3. The turning of the cylinder F moves the first longitudinal row of plungers E away from the pins D, and the next following second row of plungers assume the lowermost position directly above the pins D, so that the corresponding slide of the second row of longitudinal plungers now has its lug $E^7$ over the upper end of the lever $G'$, which by its spring $G^2$ had again assumed its former position and pressed the rod G outward again. The operator now proceeds to set the second combination in the same manner as above described—that is, he pushes in the stops K under the corresponding stops B, forming the second combination. When this is done, he pushes in the rod G, so as to lock the second longitudinal row of plungers, after which the hand-wheel $H'$ is again turned around once, whereby the cylinder F is moved one division and the pointer $I^2$ moves to the numeral 3 on the dial $I^5$. The operation is repeated until the operator has set all the desired number of combinations of registers, taking care to determine previously from his music-score in what order he requires the combinations already set. After all the different combinations are set the operator turns the hand-wheel $H'$ until the pointer $I^2$ again stands over the numeral 1, and then he also turns the hand-wheel $M'$ from right to left until the pointer $M^2$ stands on the line $m$. This movement of the hand-wheel $M'$ disengages the pawl $M^8$ from the pawl N, and the latter swings downward and drops with its projection $N'$ into the respective notch in the wheel $F^3$, whereby the cylinder F is locked. When this is done, the combinations of registers are ready for use and will come on in the order in which they were set. They can be used again and again, if necessary, in the same order as before, as the combinations remain locked until disturbed by the means hereinafter to be described.

As illustrated in Fig. 1, the instrument is capable of twelve different divisions; but it is evident that the instrument may be constructed to contain any desired number of combinations. Forty or fifty combinations will be enough for any practical requirements;

but a thousand may be employed, if necessary. If the organist sets every combination that the capacity of the registers and their mechanism permit, that act brings the pointer $I^2$ over the numeral 1 again, thus making the instrument ready for use without further preparation, except turning the hand-wheel $M'$, as above described. If a smaller number of combinations is used, however, than the capacity of the register indicates, then the operator, after setting the last combination, simply turns the hand-wheel $H'$ until the pointer $I^2$ stands over the numeral 1, as before described.

When the first longitudinal row of plungers E is in the lowermost position, then the levers $C^7$ corresponding to the outermost plungers E in that lowermost row of plungers are held downward on one end by the corresponding pins D, whereby the other end of the levers $C^7$ is in a raised position and the levers $C^4$ are held correspondingly, whereby the rods $C^2$, with their pins C, are held downward, while the rods $C^3$, with their pins $C'$, are in an uppermost position. The pins C in the corresponding connecting-rods $B^6$ are then in front of the bar $T^{10}$, while the other pins $C'$ in the same connecting-rods $B^6$ are withdrawn. When the operator now proceeds to play the music on the organ, he performs on the respective key-boards $A'$, $A^2$, and $A^3$, in the usual manner, according to his music-score, and the moment the first combination set is needed according to the music-score he touches with one of his fingers any one of the bars $R^5$ of the U-shaped levers $R^4$, so that the valves $P^4$ and $P^5$ in the bellows P and Q are opened and the air from the bellows P is exhausted into the empty bellows Q, whereby the bellows P collapse. The lever $T'$ then swings, moving the links $T^2$ upward and turning the shafts $T^6$ and $T^7$, which, by the bar $T^{10}$, operate on the pins C, projecting through the connecting-rods $B^6$, as previously described, so that the corresponding connecting-rods $B^6$ are moved to the left, and the respective levers $B^7$ push the slides $A^8$ inward into connection with the pipes $A^7$ and the wind-chests $A^6$. When the corresponding keys on the key-boards $A'$, $A^2$, and $A^3$ are then played, the said combination of registers will sound.

The upward movement of the links $T^2$ and $T^3$, as above described, causes a swinging of the lever U, whereby its outer end passes up the incline of the wedge $U^2$ of the rod $U^3$, so that the latter is swung to the left until the end of the lever U passes over the top of wedge $U^2$, and the rod $U^3$ returns by its gravity to the former position. The end of the lever U now rests on the top of wedge $U^2$.

When the bellows P collapse, as before described, then the link $O^6$, connected with the said bellows, draws the plate O downward, so that the beveled edge $O^4$ of the projection $O^2$ of the arm $O'$ passes over the pin $F^4$, engaged with the beveled edge $O^4$, as is plainly shown in Fig. 7. When the bellows P have completely collapsed, then the top of the projection $O^2$ snaps under the corresponding pin $F^4$ by the action of the spring $O^3$. The downward movement of the plate O also causes a swinging of the lever $N^7$, so that the link $N^6$ swings the pawl N upward, thereby disengaging the projection $N'$ from the corresponding notch of the wheel $F^3$. The cylinder F is now unlocked and is free to revolve. Now as soon as the bellows P in collapsing act on the projection $S^4$ of the rod $S^3$, so as to throw the gravity-pawl S out of contact with the lever $P^6$, as above described, then the valves $P^4$ and $P^5$ are closed, the bleeding-valve $P^7$ is opened, and outside air again rushes into the bellows P and fills the same, so that the bellows P are again expanded and the link $O^6$ is pushed upward, assisted by the action of the spring $O^5$ on the plate O. The latter, in its upward movement, turns the cylinder F the distance of one division by the projection $O^2$ engaging the corresponding pin $F^4$, resting on top of the said projection. The plate O, in its upward movement, also acts on the lever $N^7$, so that the latter, by the link $N^6$, throws the pawl N downward, and its projection $N'$ engages the next following notch of the wheel $F^3$, thereby again locking the cylinder F in place after it is moved from one longitudinal row of plungers E to the next following one. The expanding of the bellows P also operates the lever $T'$, so that the links $T^2$ and $T^3$ are moved downward and cause a turning of the shafts $T^6$ and $T^7$, whereby the lever U is moved downward at its outer end, and consequently presses on the top of the wedge $U^2$, whereby the rod $U^3$ is moved downward and the shaft $U^5$ is turned, so that its frame $U^4$ presses all the raised levers $C^7$ into a lowermost position at their outer ends. The other ends of the levers $C^7$, connected by the links $C^6$ with the levers $C^4$, are thus raised, and the pins C and $C'$ again change their positions. The action of the lever $T'$ on the shafts $T^6$ and $T^7$, as above described, causes a lateral movement of the plates $T^{10}$ and $T^{11}$, whereby the connecting-rods $B^6$ are moved to the right and the corresponding slides $A^8$ are disconnected from the pipes $A^7$ and the wind-chests $A^6$. At this time the second longitudinal row of plungers E has come to its lowermost position, and at that very instant the rod $U^3$ again slides upward as the wedge $U^8$, acting on the fixed pin $U^9$, causes a swinging of the rod $U^3$ to the left, whereby the lever U is tripped off of the wedge $U^2$. The weights $C^5$ on the levers $C^4$, connected with the levers $C^7$, cause the latter to swing upward at their outer ends on those pins D free to slide up against the plungers E not in the second combination. The other levers $C^7$ remain in their lowermost position as the corresponding pins D are held downward by the plungers in the combination and in their outermost position on the pins $E^2$. Thus the second combination on the cylinder F is ready to act on the corresponding slides $A^8$, in order to connect the latter with the corresponding pipes A⁷ and wind-chests A⁶, whenever the operator presses one of the bars R⁵ of the U-shaped levers R⁴ downward, as above described. The same operation is repeated for the remaining combinations on the cylinder F.

Thus it will be seen that the operator is enabled to set any desired combination of registers on the cylinder F on one of its longitudinal rows of plungers, and he can set any number of such combinations of registers on the said cylinder on the several longitudinal rows of plungers.

It will further be seen that the operator can bring the several combinations of plungers into play whenever he wants them by simply touching one of the bars R⁵, located above the key-boards A′, A², and A³. Thus it will be seen, further, that the desired movements of the cylinder F and the slides A⁸ are automatic and take place in consecutive order according to the music-score.

When the operator desires to unlock the several combinations on the cylinder F, he moves the hand-wheel M′, with its pointer M², to the line m′, so that the pawl M³ lifts the pawl N, and the cylinder F is free to revolve. He then presses the rod J inward, whereby the lever J′ is swung and presses against the corresponding slide E³, so that the latter moves inward into the position shown in Fig. 9, and the plungers E move downward into their outermost position. The operator then turns the hand-wheel H′ one revolution, so that the next following longitudinal row of plungers is brought into the lowermost position. The operator then again presses the rod J inward, so that its lever J′ moves the slide E³, belonging to the second longitudinal row of plungers, inward into the same position as shown in Fig. 9. Thus the several slides E³ are unlocked from the cylinder F by the operator alternately turning the hand-wheel H′ one revolution and then pushing the rod J inward. After all the combinations are unset the operator may again reset different combinations on the cylinder F in the manner before described.

One or more of the stops B and corresponding pins K may be utilized to operate corresponding swells W. (Shown in Fig. 18.) The opening and closing of the shutters W³ of each swell W is similar to the opening and closing of the slides A⁸, and hence no further description of the device is needed. It will be understood that the swell W may be set into the combination of slides A⁸, or only a single swell or two swells may be set in one longitudinal row of plungers without setting any slides A⁸ in the same combination.

I do not limit myself to the special construction of the various devices shown and described, as other devices may be constructed to accomplish the same result—for instance, the cylinder with its plungers may be superseded by a revolving disk with radially-arranged plungers acting on the pins D and levers C⁶.

Having thus fully described my invention, I claim as new and desire to secure by Letters Patent—

1. In an organ, the combination, with a cylinder mounted to rotate, of movable plungers held on the said cylinder and adapted to be set from the draw-stops, substantially as shown and described.

2. In an organ, the combination, with a cylinder mounted to rotate, of movable plungers held on the said cylinder, and draw-stops connected with the said plungers and serving for adjusting the same, substantially as shown and described.

3. In an organ, the combination, with a cylinder mounted to rotate, of combination plungers held on the said cylinder and adapted to control the register-slides, substantially as shown and described.

4. In an organ, the combination, with the register-slides, of a cylinder mounted to rotate, and combination plungers held on the said cylinder and adapted to control said register-slides, substantially as shown and described.

5. In an organ, the combination, with register-slides, of a cylinder mounted to rotate, and rows of combination plungers held on the said cylinder and adapted to control consecutively corresponding register-slides, substantially as shown and described.

6. In an organ, the combination, with a cylinder mounted to rotate, and plungers arranged in rows on the said cylinder and mounted to slide, of a slide held to move longitudinally on the said cylinder and adapted to lock or unlock said plungers, substantially as shown and described.

7. In an organ, the combination, with a cylinder mounted to rotate, and plungers arranged in rows on the said cylinder and mounted to slide, of a slide held to move longitudinally on the said cylinder and adapted to lock or unlock said plungers, and levers under the control of the operator and serving to move the said slides inward or outward on the said cylinder, substantially as shown and described.

8. In an organ, the combination, with a cylinder provided with annular grooves, of pins held in the said annular grooves to form longitudinal rows, plungers held to slide on the said pins and each provided with an annular recess, and slides held to move longitudinally on the said cylinder on each row of plungers to lock or unlock the latter in innermost or outermost position, substantially as shown and described.

9. In an organ, the combination, with a cylinder provided with annular grooves, of pins held in the said annular grooves to form longitudinal rows, plungers held to slide on the said pins and each provided with an annular recess, slides held to move longitudinally on the said cylinder on each row of plungers to lock or unlock the latter in innermost or outermost position, and levers under the control of the operator for moving the said slides forward or backward to lock or unlock said plungers, substantially as shown and described.

10. In an organ, the combination, with a cylinder having annular grooves, of rows of plungers held to slide on pins in the said annular grooves and provided with recesses, slides for locking or unlocking one row of plungers, pins held to slide vertically and adapted to engage the lowermost row of plungers on the said cylinder, and levers locked in place by the said pins and controlling the opening and closing of the register-slides, substantially as shown and described.

11. In an organ, the combination, with a cylinder and longitudinal rows of plungers held to slide on the said cylinder, of slides held on the said cylinder and adapted to lock or unlock said rows of plungers, and means, substantially as described, for turning the said cylinder from the front of the organ, as set forth.

12. In an organ, the combination, with a cylinder and longitudinal rows of plungers held to slide on the said cylinder, of slides held on the said cylinder and adapted to lock or unlock said rows of plungers, a shaft connected with the said cylinder and mounted to rotate so that one revolution of the said shaft moves the said cylinder the distance between two longitudinal rows of plungers, substantially as shown and described.

13. In an organ, the combination, with a cylinder and longitudinal rows of plungers held to slide on the said cylinder, of slides held on the said cylinder and adapted to lock or unlock said rows of plungers, a shaft connected with the said cylinder and mounted to rotate so that one revolution of the said shaft moves the said cylinder the distance between two longitudinal rows of plungers, and an indicator operated from the said cylinder and indicating the position of the longitudinal rows of plungers, substantially as shown and described.

14. In an organ, the combination, with a cylinder mounted to rotate and provided with longitudinal rows of plungers held to slide on the said cylinder, of slides adapted to lock and unlock said longitudinal rows of plungers, and means, substantially as shown and described, for locking the said cylinder in place, as set forth.

15. In an organ, the combination, with a cylinder mounted to rotate and provided with longitudinal rows of plungers held to slide on the said cylinder, of slides adapted to lock or unlock said longitudinal rows of plungers, and means, substantially as shown and described, for unlocking said cylinders, as set forth.

16. In an organ, the combination, with a cylinder mounted to rotate and provided with longitudinal rows of plungers held to slide on said cylinder, of slides adapted to lock or unlock said longitudinal rows of plungers, means, substantially as shown and described, for locking the said cylinder in place, and means, substantially as shown and described, for unlocking the said cylinder, as set forth.

17. In an organ, the combination, with a cylinder provided with longitudinal rows of plungers held to slide on the said cylinder, of slides controlled by the operator and serving to lock or unlock said longitudinal rows of plungers, pins held to slide directly under the lowermost row of plungers, levers adapted to rest against the under side of the said pins and connected with the register-slides, and means, substantially as described, for operating said levers, as set forth.

18. In an organ, the combination, with a cylinder provided with longitudinal rows of plungers held to slide on the said cylinder, of slides controlled by the operator and serving to lock or unlock said longitudinal rows of plungers, pins held to slide directly under the lowermost row of plungers, levers adapted to rest against the under side of the said pins and connected with the register-slides, and stops connected with the said levers for drawing the latter downward at one end, so as to move the corresponding pin downward and permit an outward movement of the corresponding plunger in the lowermost row of plungers on the said cylinder, substantially as shown and described.

19. In an organ, the combination, with a cylinder provided with longitudinal rows of plungers held to slide on the said cylinder, of slides controlled by the operator and serving to lock or unlock said longitudinal rows of plungers, pins held to slide directly under the lowermost row of plungers, levers adapted to rest against the under sides of said pins and connected with the register-slides, stops connected with the said levers for drawing the latter downward at one end, so as to move the corresponding pin downward and permit an outward movement of the corresponding plunger in the lowermost row of plungers in the said cylinder, and means, substantially as shown and described, for moving all the raised levers downward during the turning of the cylinder, substantially as shown and described.

20. In an organ, the combination, with the register-slides, of connecting-rods connected with the said register-slides, pins held to slide vertically in the said connecting-rods in such a manner that when one is in its uppermost position the other is in its lowermost position, plates adapted to engage the said pins, and bellows connected with the said plates to push the same against the projecting pins which change the position of the said slides, substantially as shown and described.

21. In an organ, the combination, with the register-slides, of connecting-rods connected with the said register-slides, pins held to slide vertically in the said connecting-rods in such a manner that when one is in its uppermost position the other is in its lowermost position, plates adapted to engage the said pins, bellows connected with the said plates to push the same against the projecting pins to change the position of the said slides, balanced levers connected with the said pins, and a cylinder provided with longitudinal rows of pins acting on the said levers to change the positions of the said pins, substantially as shown and described.

22. In an organ, the combination, with the register-slides, of connecting-rods connected with the said register-slides, pins held to slide vertically in the said connecting-rods in such a manner that when one is in its uppermost position the other is in its lowermost position, plates adapted to engage the said pins, bellows connected with the said plates to push the same against the projecting pins to change the position of the said slides, balanced levers connected with the said pins, a cylinder provided with longitudinal rows of pins acting on the said levers to change the positions of the said pins, and means, substantially as described, for operating said levers by the action of said bellows, substantially as shown and described.

23. In an organ, the combination, with the register-slides, of connecting-rods connected with the said register-slides, pins held to slide vertically in the said connecting-rods in such a manner that when one is in its uppermost position the other is in its lowermost position, plates adapted to engage the said pins, bellows connected with the said plates to push the same against the projecting pins to change the position of the said slides, balanced levers connected with the said pins, a cylinder provided with longitudinal rows of pins acting on the said levers to change the positions of the said pins, means, substantially as described, for operating said levers by the action of said bellows, and means, substantially as described, for turning the said cylinder from the said bellows, as set forth.

24. In an organ, the combination, with a bellows connected with a box, of a second bellows connected with said box and adapted to be exhausted, valves held in the said box to connect the first-named bellows with the second-named bellows and disconnect the same, and a bleeding-valve held on the said box to connect the latter with the outside, substantially as shown and described.

25. In an organ, the combination, with a bellows connected with a box, of a second bellows connected with the said box and adapted to be exhausted, valves held in the said box to connect the first-named bellows with the second-named bellows and disconnect the same, a bleeding-valve held on the said box to connect the latter with the outside, and a lever carrying the said valves and the said bleeding-valve and under the control of the operator, substantially as shown and described.

26. In an organ, the combination, with a bellows connected with a box, of a second bellows connected with the said box and adapted to be exhausted, valves held in the said box to connect the first-named bellows with the second-named bellows and disconnect the same, a bleeding-valve held on the said box to connect the latter with the outside, a lever carrying the said valves and the said bleeding-valve and under the control of the operator, and a locking device, substantially as shown and described, for locking said lever in place automatically, as set forth.

27. In an organ, the combination, with a bellows connected with a box, of a second bellows connected with the said box and adapted to be exhausted, valves held in the said box to connect the first-named bellows with the second-named bellows and disconnect the same, a bleeding-valve held on the said box to connect the latter with the outside, a lever carrying the said valves and the said bleeding-valve and under the control of the operator, a locking device, substantially as shown and described, for locking said lever in place automatically, and a lever for unlocking said locking device and operated from the first-named bellows, substantially as shown and described.

28. In an organ, the combination, with plungers, of a perforated slide which moves and is constructed, as specified, to adapt it for engagement with and locking or unlocking the said plungers, substantially as shown and described.

29. In an organ, the combination, with levers for operating the register-slides, of pins held to slide and adapted to rest on top of the said levers, and a row of plungers held above the said pins to regulate the position of the said levers, substantially as shown and described.

30. In an organ, the combination, with levers for operating the register-slides, of pins held to slide and adapted to rest on top of the said levers, a row of plungers held above the said pins to regulate the position of the said levers, and a slide for locking or unlocking the said plungers, substantially as shown and described.

31. In an organ, the combination, with register-slides, of a finger bar or bars held over the key-boards and adapted to operate the said register-slides, substantially as shown and described.

32. In an organ, the combination, with swell-shutters, of a finger bar or bars held over the key-boards and adapted to operate the said swell-shutters, substantially as shown and described.

33. In an organ, the combination, with plungers, of push-stops located near the key-boards and serving to set the said plungers, cylinder, and perforated slides in combinations of register-slides, substantially as shown and described.

34. In an organ, the combination, with an indicator connected with the register-slides to indicate combinations of the said slides, of a finger bar or bars held over the key-boards and operating the said indicator, so that the latter indicates consecutive combinations of register-slides, substantially as shown and described.

35. In an organ, the combination, with register-slides, of an indicator connected with the said slides to indicate combinations of the same, and a finger bar or bars held on the key-board and actuating the said indicator, so that the latter indicates consecutive combinations of the said register-slides, substantially as shown and described.

ROMAINE CALLENDER.

Witnesses:
C. SEDGWICK,
EDWARD M. CLARK.